US005476392A

United States Patent [19]
Inaba et al.

[11] Patent Number: 5,476,392
[45] Date of Patent: Dec. 19, 1995

[54] CONNECTOR DEVICE

[75] Inventors: Shigemitsu Inaba; Shigemi Hashizawa; Hidehiko Kuboshima, all of Shizuoka, Japan

[73] Assignee: Yazaki Corporation, Tokyo, Japan

[21] Appl. No.: 229,666

[22] Filed: Apr. 19, 1994

[30] Foreign Application Priority Data

Apr. 19, 1993 [JP] Japan .................................. 5-114253

[51] Int. Cl.⁶ .................................................. H01R 13/64
[52] U.S. Cl. ............................ 439/376; 439/341; 439/911
[58] Field of Search ................................ 439/31, 247, 248, 439/376, 378, 509–511, 911, 341

[56] References Cited

U.S. PATENT DOCUMENTS

| | | | |
|---|---|---|---|
| 4,360,241 | 11/1982 | Fukunaga | 439/911 X |
| 5,078,615 | 1/1992 | Benson et al. | 439/376 X |

FOREIGN PATENT DOCUMENTS

| | | |
|---|---|---|
| 56-59783 | 5/1981 | Japan . |
| 384572 | 8/1991 | Japan . |

Primary Examiner—David L. Pirlot
Attorney, Agent, or Firm—Sughrue, Mion, Zinn, Macpeak & Seas

[57] ABSTRACT

In a connector device, a female connector is fixedly mounted on a first base body, and a male connector 10 is mounted on a second base body which is swingable about a rotating axis with respect to the first base body, in such a manner that the male connector is loosely fitted in a guide, being displaceable in a direction perpendicular to the rotating axis, and is kept urged towards the rotating axis by urging means. Hence, the guide member of the male connector is engaged with a guide hole of the female connector while abutting against the wall surface, on the side of the rotating shaft, of the guide hole, which makes it possible to decrease the dimension L1 of the guide hole in the direction perpendicular to the rotating axis. That is, the connector device can be miniaturized.

6 Claims, 6 Drawing Sheets

5,476,392

CONNECTOR DEVICE

BACKGROUND OF THE INVENTION

1. Field of the Invention

This invention relates to a connector device comprising a male connector and a female connector, and more particularly to a connector device which is so designed that, by turning a base body supporting a male connector with respect to a base body supporting a female connector, the male connector is disconnected from the female connector, to break the high voltage circuit, thereby to ensure safety during maintenance work.

2. Related Art

For instance, an electric panel for a high voltage circuit is designed as follows: When the cover of the electric panel is opened, a male connector secured to the cover is disconnected from a female connector secured to the body of the electric panel, to break the high voltage circuit, so that even if the worker touches the electrode accidentally, he will never get electric shock.

An electric vehicle, which has been highly regarded as a pollution-free vehicle, has a high voltage system for driving the electric motor. Therefore, it is necessary to provide means for preventing the occurrence of an accident that the worker gets electric shock carelessly touching the high voltage system during maintenance.

For this purpose, a conventional electric vehicle is provided with a switch for breaking the high voltage system. The switch is operated before the maintenance work is started. In general, the maintenance work of an electric vehicle is carried out by the specialists; however, sometime it is performed by persons not skilled in the maintenance work. In the latter case, there may be a high possibility that the persons may forget to turn off the switch, thus getting electric shock. Hence, in the case of an electric vehicle, too, it is desirable that the high voltage circuit is provided in the electric panel, and whenever the cover of the electric panel is opened, the high voltage circuit is automatically interrupted.

In the above-described device which breaks the high voltage circuit when the cover of the electric panel is opened, the male connector is mounted on the cover of the electric panel and the female connector on the body of the latter. There-fore, if the positions of the male connector and the female connectors are shifted, it is difficult to smoothly connect those connectors with each other or disconnect them from each other.

SUMMARY OF THE INVENTION

In view of the foregoing, an object of this invention is to provide a connector device which is small in size, and has a relatively large allowance for the positional shift of the female connector with respect to the male connector.

The foregoing object of the invention has been achieved by the provision of a connector device comprising: a female connector having contactors to which electrical wires are connected, and a guide section in the form of a recess; an electrode pin mounted on a second base body which is swingable about a rotating axis with respect to a first base body on which the female connector is mounted, in such a manner that both end portions of the electrode pin are engageable with the contactors; and a male connector having a guide member which is engaged with the guide section to position the male connector with respect to the female connector, wherein the male connector has a reference position where, when the male connector turns about the rotating axis, the wall surface, on the side of the rotating axis, of the guide member abuts against the wall surface, on the side of the rotating axis, of the guide section, the male connector being mounted on the second base body in such a manner that the male connector is displaceable from the reference position at least to move away from the rotating axis, and means for urging the male connector towards the reference position is interposed between the male connector and the second base body.

When the second base body to which the male connector is fixedly secured is turned about the rotating axis of the first base body to which the female connector is secured, then the wall surface, on the side of the rotating axis, of the guide member of the male connector is abutted against the wall surface, on the side of the rotating axis, of the guide section of the female connector. When, under this condition, the second base body is further turned, the guide member is displaced by the wall surface of the guide section to move away from the rotating axis against the elastic force of the urging means, and it, being pushed by the urging means, is inserted into the guide section while contacting the wall surface, on the side of the rotating axis, of the guide section.

As was described above, in the connector device of the invention, the guide member is inserted into the guide section while being abutted against the wall surface, on the side of the rotating axis, of the guide section. Therefore, it is unnecessary to increase the dimension of the guide section thereby to allow the positional shift of the guide member in a direction perpendicular to the rotating axis.

When the mounting position of the male connector on the second base body is shifted in such a manner that it is moved away from the rotating axis, the base end portion of the wall surface of the guide member abuts against the wall surface of the guide section; whereas when the mounting position is shifted in such a manner that it approaches the rotating axis, the outer end portion of the wall surface of the guide member 17 abuts against the wall surface of the guide section, which absorbs the shift in mounting position of the male connector on the second base body.

DETAILED DESCRIPTION OF THE PREFERRED EMBODIMENTS

Examples of a connector device according to this invention will be described with reference to the accompanying drawings in detail.

Figure 9A:
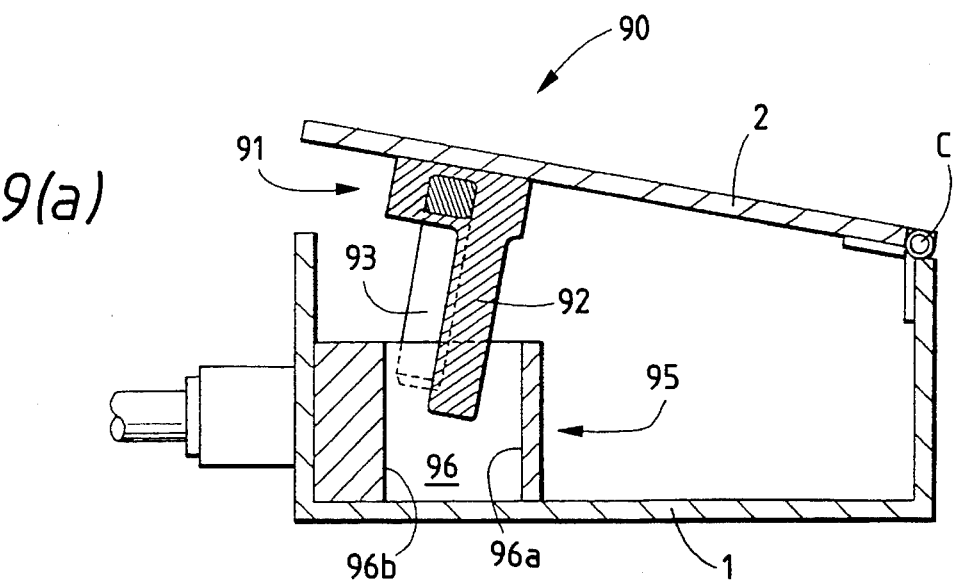
FIGS. 9 (a) to (c) are explanatory diagrams for a description of the operation of a conventional connector device.
Figure 9B:
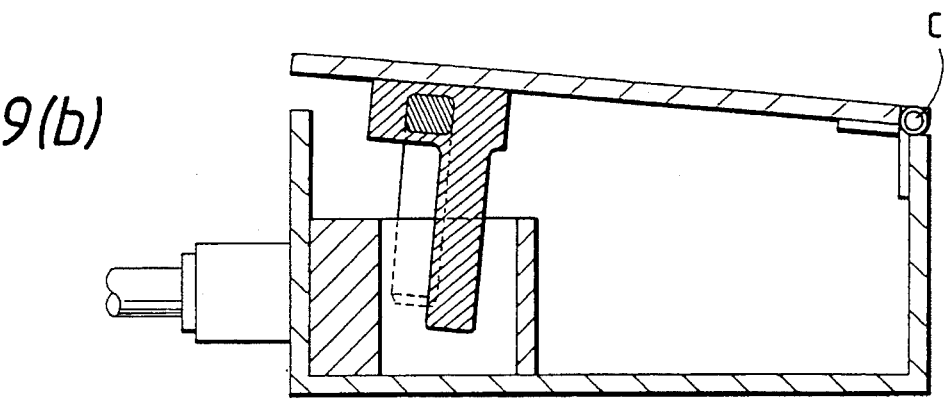
Figure 9C:
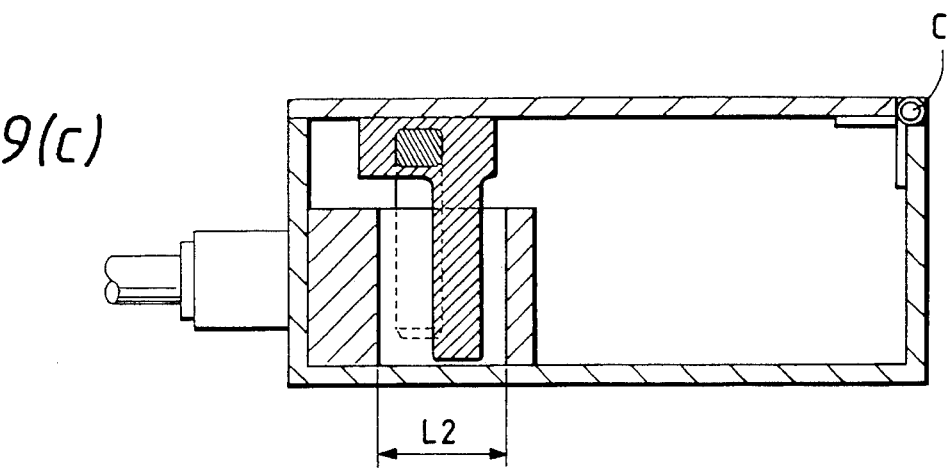

As shown in FIGS. 9(a) to (c) of a conventional device, a male connector and a female connector are positioned. That is, a guide member 92 is extended on the side of the male connector 91, while a guide hole 96 for receiving the guide member 92 is provided on the side of the female connector 95, so that, even if the male connector 91 and the female connector 95 are somewhat shifted in position from each other, the guide member 91 is engaged with the guide hole 96.

On the other hand, it is essential that, even in the case where the male connector 91 and the female connector 95 are greatly shifted in position from each other, the guide member 92 is able to engage with the guide hole 61. For this purpose, the dimension L2 of the guide hole 96 is made relatively large; that is, the dimension L2 is so determined that, with the male connector 91 positioned correctly, the guide member 92 will never touch the wall of the guide hole 96 at all. Accordingly, the conventional device 90 is bulky, and therefore it is not applicable to an electric vehicle which is small in mounting space. On the other hand, if it is intended to decrease the dimensions of the male connector 91 and the female connector 95, then the allowance in positional shift of the male and female connectors is decreased as much. Hence, the decreasing of the dimensions of those connectors is not practical for motor vehicles which are fluctuated in dimensional accuracy being produced on large scale. If, on the other hand, the installation accuracy of the male connector and the female connector is increased, then the manufacturing cost is increased.

In view of the forgoing problem, an embodiment of the present invention will now be described in more detail.

Figure 1:
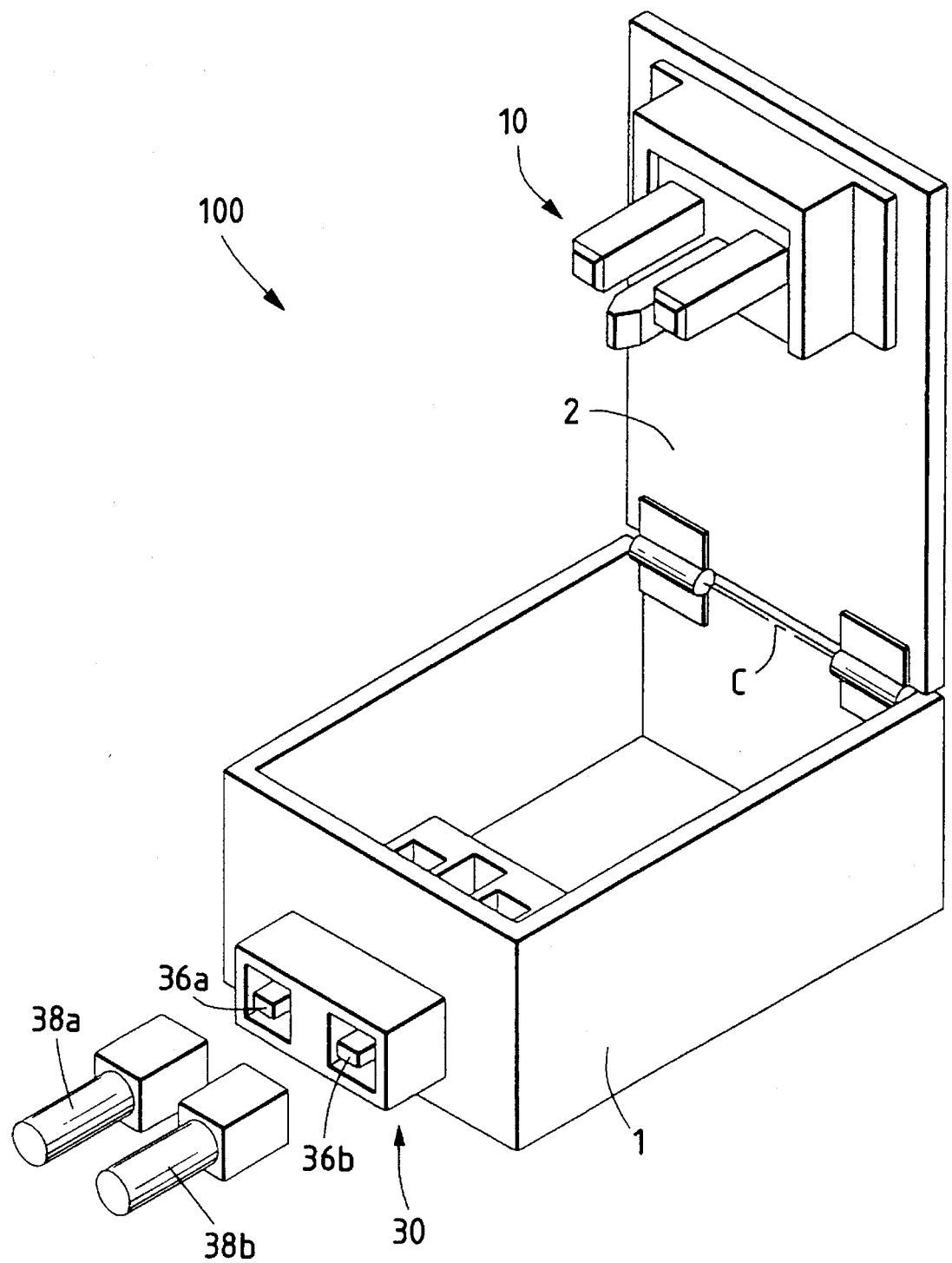
FIG. 1 is a perspective view of an electric panel to which an example of a connector device of a second embodiment of the present invention.
Figure 2A:
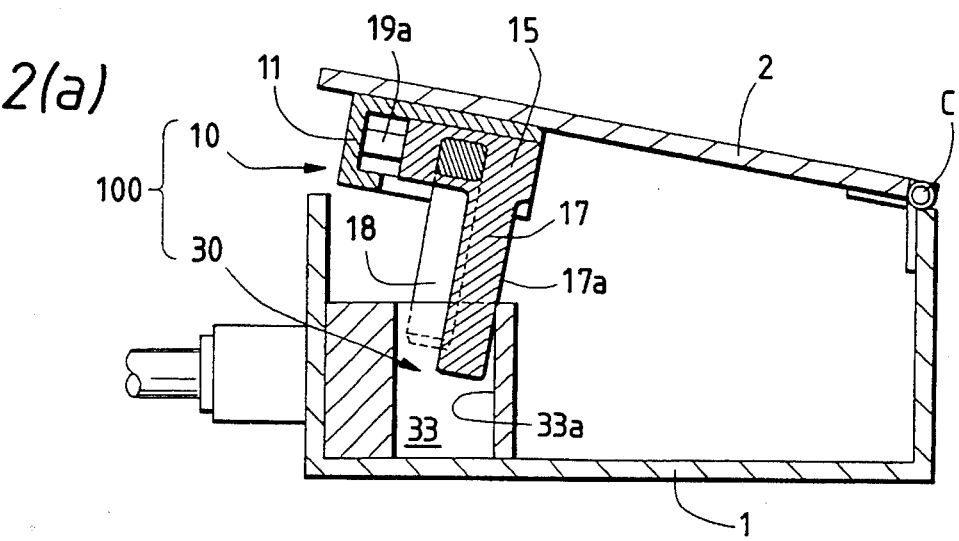
FIGS. 2 (a) to (c) are sectional views showing essential components of the connector device.
Figure 2B:
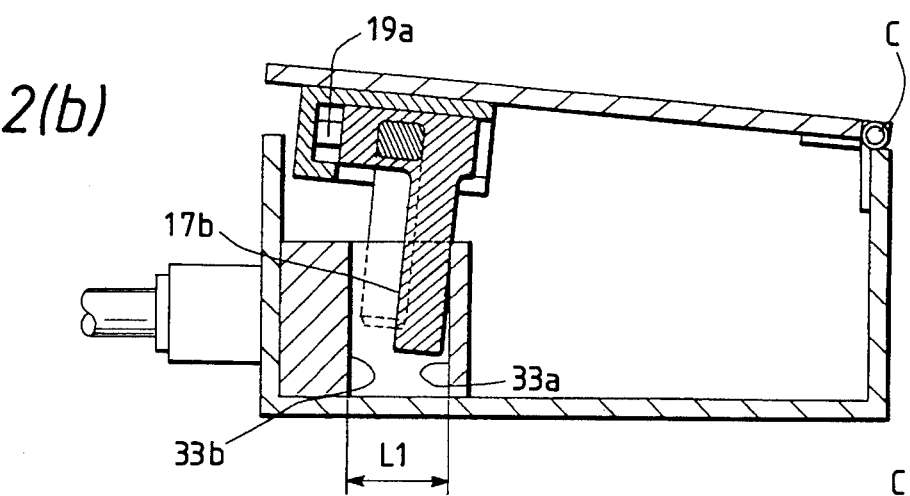
Figure 2C:
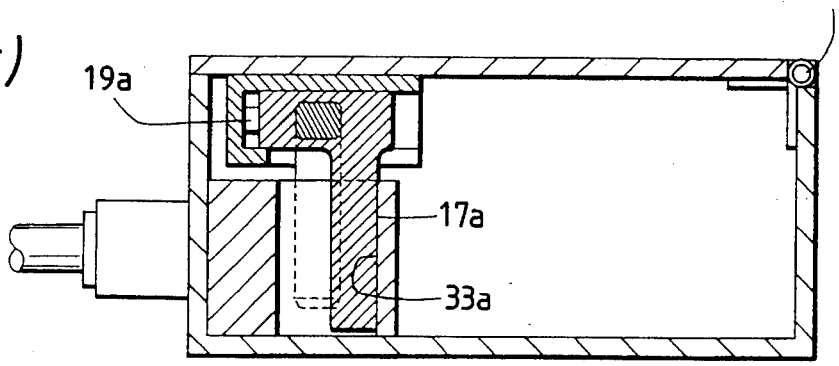

As shown in FIGS. 1 and 2, the connector device of the second embodiment of the present invention is applied to an electric panel, and roughly stated, it comprises: a female connector 30 fixedly secured to a first base body 1 which is the body of the electric panel; and a male connector 10 fixedly secured to a second base body 2 which is the lid of the electric panel body. That is, the second base body 2 is swingable about the rotating axis C.

A part of the female connector 30 is exposed outside the first base body 1, and high voltage wires 38a and 38b are connected to it.

Figure 3:
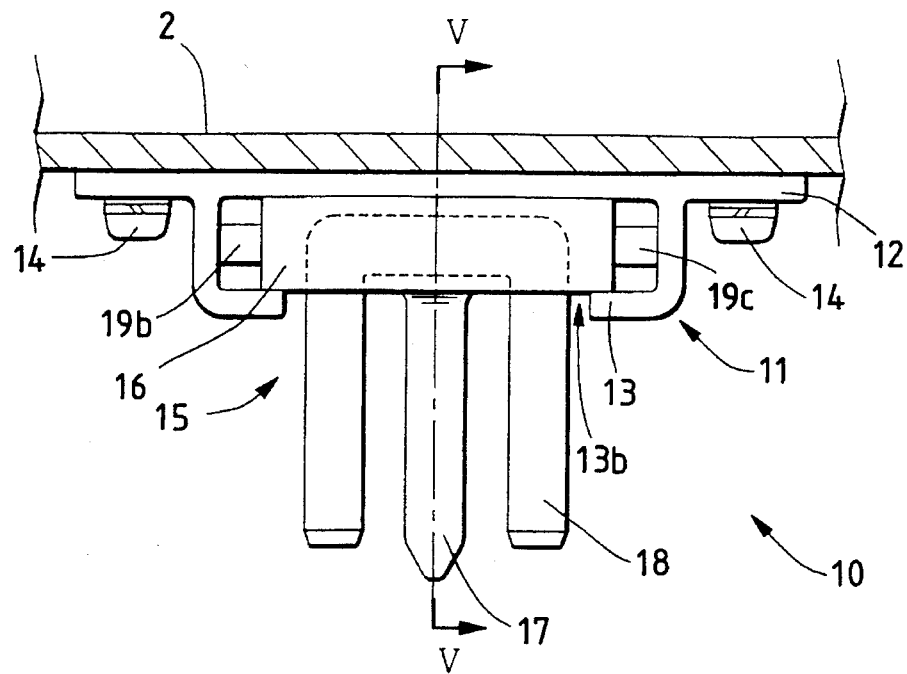
FIG. 3 is a front view of a male connector in the second embodiment of the connector device of the present invention.
Figure 4:
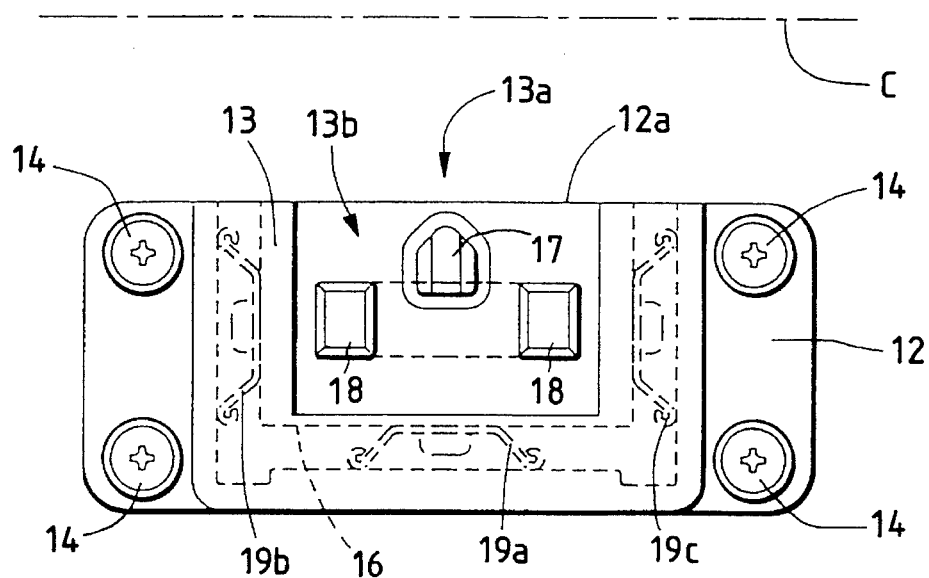
FIG. 4 is a plan view of the male connector in the second embodiment of the connector device of the present invention.

The male connector 10, as shown in FIGS. 2 through 4, comprises: a guide 11 fixedly mounted on the second base body 2 with bolts 14; and a connector body 15 which is loosely fitted inside the guide 11, being movable vertically and horizontally with respect to the rotating axis C.

The guide 11 comprises: a rectangular base plate 12 which is held on the second base body 2 with its long sides set in parallel with the rotating axis C;.and a box-shaped frame 13 which is integral with the base plate 12. The frame 13 has an opening 13a on the side of the rotating axis C, and an opening 13b on the side of the female connector 30.

Figure 5:
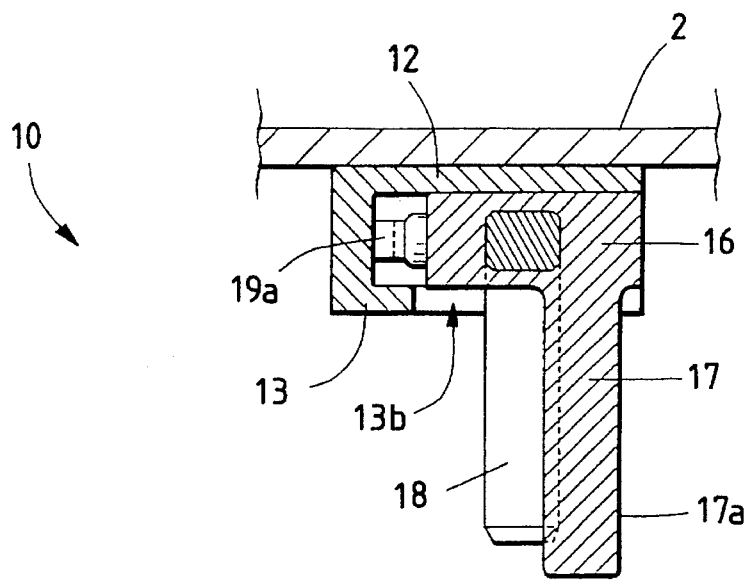
FIG. 5 is a sectional view taken along line V—V in FIG. 3, showing the male connector.

The connector body 15 of the male connector 10 comprises: a parallelepiped base 16 made of an insulating resin material; a guide member 17 extended from the base 16 as shown in FIG. 5; and an electrode pin 18 of copper having two end portions protruded from the base 16 in such a manner that they are in parallel with the guide member 17.

The electrode pin 18 is substantially U-shaped as shown in FIG. 3 (viewed from the front), and it is embedded in the base 16 by resin molding in such a manner that its root portion is farther from the rotating axis C than the guide member 17.

The base 16 of the connector body 15 is inserted into the frame 13 of the guide 11 through the opening 13a and loosely fitted therein; however, it is retained inside the frame 13 with a retainer (not shown). The guide member 17 and both end portions of the U-shaped electrode pin 18 are protruded through the opening 13b of the frame 13 towards the female connector 30.

Urging means, namely, springs 19a, 19b and 19c are interposed between the base 16 of the connector body 15 and three walls of the frame 13, so that the connector body 15 is kept urged towards the rotating axis C and towards the middle of the frame 13 in the direction of the rotating axis C.

Figure 6:
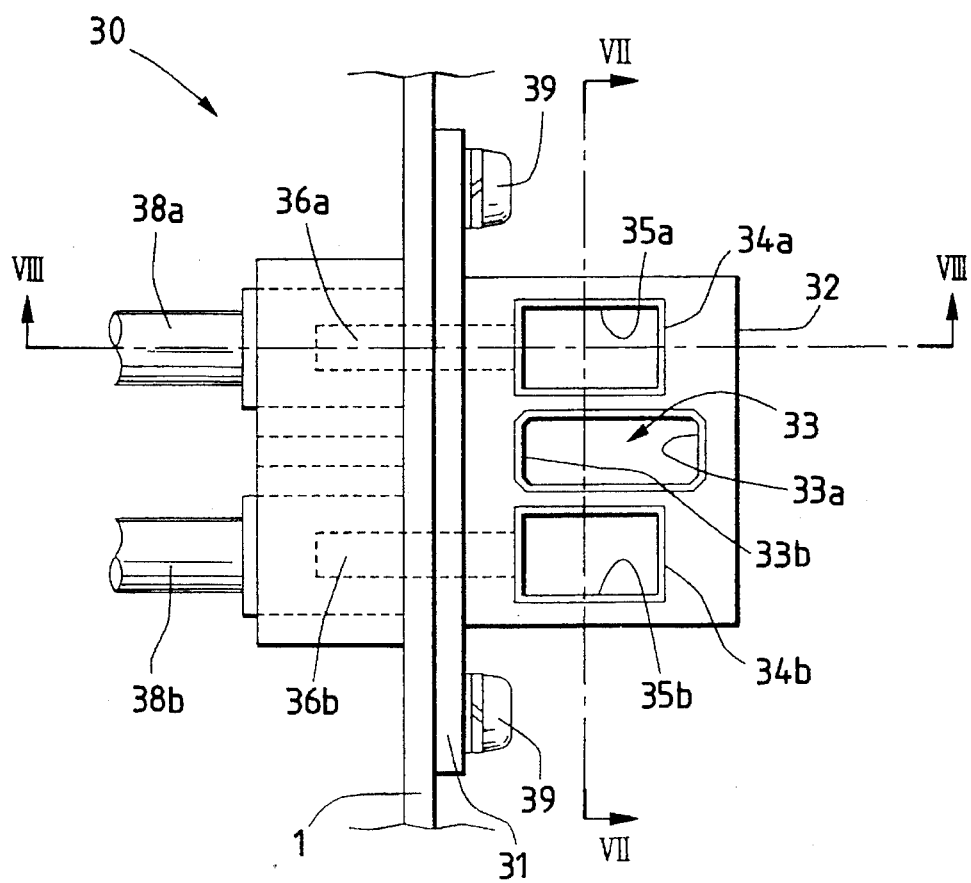
FIG. 6 is a plan view of a female connector in the second embodiment of the connector device of the present invention.
Figure 7:
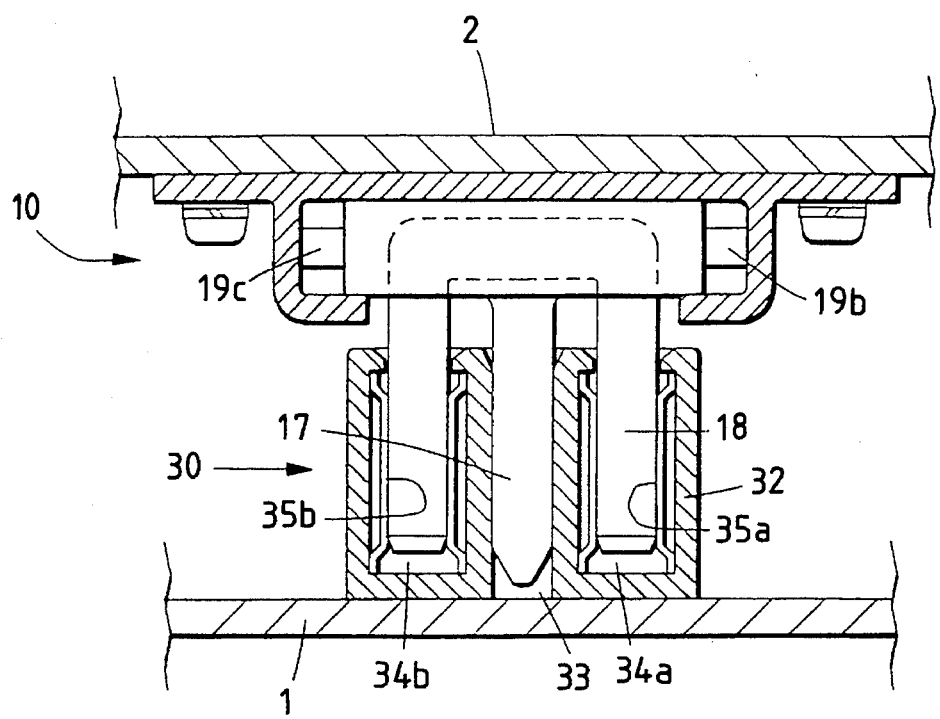
FIG. 7 is a sectional view showing the male connector engaged with the female connector, taken along line VII—VII in FIG. 6.
Figure 8:
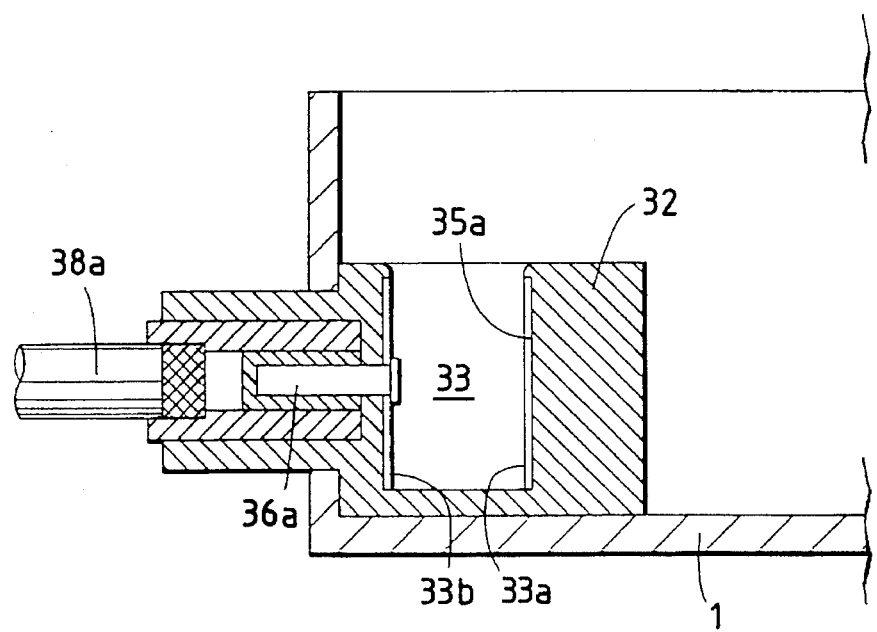
FIG. 8 is a sectional view taken along line VIII—VIII in FIG. 6.

The female connector 30, as shown in FIGS. 6 through 8, comprises: a substantially rectangular base plate 31 secured to the first base body 1 with bolts 39; and a frame 32 which is extended from the base plate 31 in such a manner that it is perpendicular to the latter 30 and is partially exposed outside the first base body 1. The base plate 31 and the frame 32 are formed as one unit with an insulating resin material. Inside the first base body 1, the frame 32 has a guide hole 33, into which the guide member 17 of the male connector 10 is inserted, in such a manner that the hole 33 is extended perpendicular to the bottom of the first base body 1. Furthermore, as shown in FIG. 6, a pair of recesses 34a and 34b are formed on both sides of the guide hole 33. The recesses 34a and 34b thus formed accommodate contactors 35a and 35b, respectively, which contact the electrode pin 18 of the male connector to apply the high voltage. The contactors 35a and 35b are connected to male tab terminals 36a and 36b, respectively, which are exposed outside the first base body 1. The male tab terminals 36a and 36b are connected to the high voltage wires 38a and 38b, respectively.

The operation of the connector device 100 thus constructed will be described with reference to FIGS. 2 (a) to (c).

The male connector 10 is positioned as follows: When, as shown in FIG. 2 (a), the male connector 10 turns about the rotating axis C, the middle of the wall surface 17a (on the side of the rotating axis C) of the guide member 17 in the longitudinal direction abuts against the edge (on the side of the male connector 10) of the wall surface 33 (on the side of the rotating axis C) of the aforementioned guide hole 33 which is formed in the female connector 30. With this position as a reference position, the male connector 10 is mounted on the second base body 2.

This method absorbs the shift in mounting position of the male connector 10 on the second base body 2: That is, when the mounting position of the male connector 10 on the second base body 2 is shifted from the reference position in such a manner that it is moved away from the rotating axis C, the base end portion of the wall surface 17a of the guide member 17 abuts against the wall surface 33a of the guide hole 33 of the female connector 30; whereas when the mounting position is shifted in such a manner that it approaches the rotating axis C, the outer end portion of the wall surface 17a of the guide member 17 abuts against the wall surface 33a of the guide hole 33. Hence, the shift in mounting position of the male connector 10 on the second base body 2 is absorbed.

When the male connector 10 is further turned as shown in FIG. 2 (b), it is displaced by the wall surface 33a in such a manner that it is moved away from the rotating axis C, as a result of which the body 15 of the male connector 10 is moved in the frame 13 of the guide 11 against the elastic forces of the urging means 29a, 19b and 19c.

In this operation, the guide member 17 is urged mainly by the elastic force of the urging means 19a, so that its wall surface 17a is kept abutted against the wall surface 33a of the guide hole 33 of the female connector 30. Therefore, the distance between the wall surface 17b of the guide member 17 which is farther from the rotating axis C and the wall surface 33b of the guide hole 33 which is farther from the rotating axis can be minimized because it is unnecessary to take into account the vertical shift of the guide member with respect to the rotating axis C. Hence, the dimension L1 of the guide hole 33 in a direction perpendicular to the rotating axis C is shorter than that L2 of the guide section of the male connector 95 in the conventional connector device shown in FIGS. 9 (a) to (c).

When the second base body 2 has been fully turned to close the first base body 1 as shown in FIG. 2 (c); that is, when the lid of the electric panel has been closed, as shown in FIG. 7, both end portions of the electrode pin 18 of the male connector 10 are in contact with the contactors 35a and 35b, so that the high voltage wires 38a and 38b shown in FIG. 6 are electrically connected to each other to allow the flow of high voltage current. (When the male connector 10 is disconnected from the female connector 30, the high voltage wires 38a and 38b are electrically disconnected from each other to suspend the flow of high voltage current.)

As was described above, in the connector device 100 of the invention, the female connector can be decreased in size. Therefore, the connector device can be installed on an electric vehicle which is small in mounting space, thus improving safety during maintenance.

Furthermore, in the connector device 100 of the invention, the male connector 10 is made up of the guide 11 and the connector body 15, and the latter 15 is displaceable not only in a direction perpendicular to the rotating axis C but also in a direction in parallel with the latter, which absorbs the shift in mounting position of the male connector 10 on the second base body 2 in the direction in parallel with the rotating axis C.

In the above-described connector device, the connector body 15 is displaced being guided by the guide 11 mounted on the second base body; however, the invention is not limited thereto or thereby. For instance, the connector device may be so modified that the male connector 10 is mounted through spring means on the second base body 2 so that the male connector 10 is displaceable with respect to the second base body in all directions.

In the connector device of the invention, the male connector is made up of the guide member and the electrode pin integral with the former, and the male connector is mounted on the second base body with the reference position where, when the male connector is turned about the rotating axis, the wall surface, on the side of the rotating axis, of the guide member abuts against the wall surface, on the side of the rotating axis, of the guide hole of the female connector. In addition, the male connector is made displaceable on the second base body in a direction perpendicular to the rotating axis, and is kept elastically urged towards the reference position. Hence, the connector device of the invention has the following effects or merits:

That is, in the connector device of the invention, the guide member of the male connector is engaged with the guide hole while abutting against the wall surface, on the side of the rotating axis, of the guide hole. Hence, it is unnecessary to increase the distance between the guide member and the wall surface of the guide hole farther from the rotating axis with the positional shift of the male connector from the female connector taken into account, which makes it possible to decrease the dimension of the guide hole of the female connector.

Hence, the connector device of the invention can be miniaturized, when compared with the conventional connector device. Therefore, it can be installed on an electric vehicle which is small in mounting space.

With the connector device, simultaneously when the lid of the electric panel is opened during maintenance, the high voltage circuit to drive the electric motor is electrically disconnected, which ensures safety during the maintenance work.

What is claimed is:

1. A connector device comprising:

a first base body;

a female connector having at least one contactor to which an electrical wire is connected, and a guide portion in the form of a recess, the female connector being mounted on said first base body;

a second base body which is pivotally connected to said first base body along a pivot axis extending in a first direction; and a male connector having an electrode pin therein which is engageable with said connector, and a guide member which is engageable with said guide portion to position said male connector with respect to said female connector, the male connector being movably mounted on said second base body so as to be movable in a second direction transverse to said first direction; and a spring for urging said male connector in said second direction with respect to said second base body towards the pivot axis.

2. A connector device as claimed in claim 1, wherein said male connector has a reference position where, when said male connector pivots about said pivot axis, a wall surface, on the side of said pivot axis, of said guide member abuts against the wall surface, on the side of said rotating axis, of said guide portion.

3. A connector device as claimed in claim 1, further comprising at least one second spring which urges said male connector in said first direction.

4. A connector device as claimed in claim 1, wherein said electrode pin is farther from said pivot axis than said guide member.

5. A connector device as claimed in claim 1, further comprising a guide having an opening on the side of said pivot axis, said guide being attached to said second base body, wherein said male connector is loosely fitted inside of said guide.

6. A connector device, comprising:

a first connector;

a base member for fixedly retaining said first connector;

a cover member pivotally secured to said base member about a pivot axis extending in a first direction so as to be movable from an open position to a closed position;

a second connector movably received by said cover member; and positioning means for moving said second connector in a second direction perpendicular to said first direction with respect to said cover member so as to automatically position said second connector with respect to said first connector in response to movement of said cover member from said open position to said closed position.

* * * * *